United States Patent
Hars

(10) Patent No.: US 9,324,361 B2
(45) Date of Patent: Apr. 26, 2016

(54) PROTECTING STORED DATA FROM TRAFFIC ANALYSIS

(75) Inventor: Laszlo Hars, Cranberry Township, PA (US)

(73) Assignee: Seagate Technology LLC, Cupertino, CA (US)

(*) Notice: Subject to any disclaimer, the term of this patent is extended or adjusted under 35 U.S.C. 154(b) by 2020 days.

(21) Appl. No.: 11/838,425

(22) Filed: Aug. 14, 2007

(65) Prior Publication Data

US 2009/0048976 A1    Feb. 19, 2009

(51) Int. Cl.
G06F 11/30    (2006.01)
G06F 12/14    (2006.01)
G06F 7/04    (2006.01)
G06F 17/30    (2006.01)
H04N 7/16    (2011.01)
G11B 20/00    (2006.01)
G06F 21/14    (2013.01)

(52) U.S. Cl.
CPC ...... G11B 20/00086 (2013.01); G06F 12/1408 (2013.01); G06F 21/14 (2013.01)

(58) Field of Classification Search
CPC ......... G06F 21/80; G06F 21/78; G06F 21/79; G06F 21/14; G06F 12/1408; H04L 9/0891; H04L 9/16; G11B 20/00478; G11B 20/0021; G11B 20/00492; G11B 20/00514; G11B 20/00086
USPC .............................. 713/189–194; 726/22–33
See application file for complete search history.

(56) References Cited

U.S. PATENT DOCUMENTS

| 5,987,572 | A | * | 11/1999 | Weidner et al. ............... 711/155 |
| 6,049,612 | A | | 4/2000 | Fielder et al. |
| 6,321,358 | B1 | | 11/2001 | Anderson |
| 6,385,727 | B1 | * | 5/2002 | Cassagnol et al. ............ 713/193 |
| 7,076,668 | B1 | * | 7/2006 | Ono et al. ..................... 713/193 |
| 2003/0091191 | A1 | * | 5/2003 | Watanabe et al. ............. 380/277 |
| 2003/0097583 | A1 | | 5/2003 | Lacan et al. |
| 2005/0204154 | A1 | * | 9/2005 | Osaki ............................ 713/193 |
| 2005/0216955 | A1 | | 9/2005 | Wilkins et al. |
| 2006/0123249 | A1 | * | 6/2006 | Maheshwari et al. ........ 713/193 |
| 2006/0123355 | A1 | | 6/2006 | Christiansen et al. |
| 2007/0253549 | A1 | * | 11/2007 | Celikkan et al. ................ 380/42 |
| 2008/0240428 | A1 | * | 10/2008 | Hobbet et al. .................. 380/45 |

FOREIGN PATENT DOCUMENTS

WO    WO 0135226 A1 * 5/2001

OTHER PUBLICATIONS

Halevi, et al., A Tweakable Enciphering Mode, Jun. 3, 2003.*
IEEE P1619™/D8, Draft Standard for Standard Architecture for Encrypted Shared Storage Media, Oct. 2006, 31 pgs.

* cited by examiner

Primary Examiner — Mohammad W Reza
Assistant Examiner — Trong Nguyen
(74) Attorney, Agent, or Firm — Cesari & Reed, LLP; Kirk A. Cesari

(57) ABSTRACT

A method including: reading a portion of stored data from a storage medium, decrypting the portion of stored data, then if changes are requested, making the changes to the portion of stored data to produce changed data, encrypting the changed data, and writing the encrypted changed data to the storage medium. An apparatus that performs the method is also included.

16 Claims, 5 Drawing Sheets

PROTECTING STORED DATA FROM TRAFFIC ANALYSIS

BACKGROUND

Data stored in various types of data storage devices such as magnetic or optical disc drives, probe storage devices, or solid-state devices, could be exposed to periodic inspections by an unauthorized party or adversary.

One way to protect data on such devices is to encrypt the data using, for example, a public key or private key encryption scheme. An adversary not knowing the key, cannot decrypt the data, but can make snapshots of the encrypted data. By comparing different snapshots, an adversary could gain some information about the stored data. The analysis of changes in data over time is referred to as traffic analysis. For example, changes in the file allocation table (or another file system area) can reveal the extent of data changes, but most importantly, changes in a database may reveal information about the changed records.

An example would be a flight reservation system in which the adversary makes a reservation and later, having gained access to the storage medium, finds where changes were made in the reservation system database. By knowing where the database changed in response to the reservation, the adversary can gain knowledge about the data structure, the locations of the records for specific flights, seats, airlines, etc. With this knowledge, targeted reservations could be followed and overbooking provoked. In this manner, an adversary may cause significant damage to an airline that relies on the reservation system database.

SUMMARY

In a first aspect, the invention provides a method including: reading a portion of stored data from a storage medium, decrypting the portion of stored data, then if changes are requested, making the changes to the portion of stored data to produce changed data, encrypting the changed data, and writing the encrypted changed data to the storage medium.

In another aspect, the invention provides an apparatus including: a storage medium, and a processor for reading a portion of stored data from the storage medium, decrypting the portion of stored data, then if changes are requested, making the changes to the portion of stored data to produce changed data, encrypting the changed data, and writing the encrypted changed data to the storage medium.

In another aspect, the invention provides a method including: storing encrypted blocks of data on a storage medium, re-encrypting selected ones of the blocks of data, and storing the re-encrypted blocks of data at different locations on the storage medium.

In another aspect, the invention provides an apparatus including: a storage medium, and a processor for storing encrypted blocks of data on the storage medium, for re-encrypting selected ones of the blocks of data, and for storing the re-encrypted blocks of data at different locations on the storage medium.

In another aspect, the invention provides a method including: encrypting blocks of data to produce encrypted blocks of data, storing the encrypted blocks of data on a storage medium, storing auxiliary data related to times at which the encrypted blocks of data were stored on the storage medium, reading the encrypted blocks of data from the storage medium, re-encrypting the encrypted blocks of data, storing the re-encrypted blocks of data on the storage medium, and storing auxiliary data related to times at which the re-encrypted blocks of data were rewritten on the storage medium.

In another aspect, the invention provides an apparatus including: a storage medium, and a processor for encrypting blocks of data to produce encrypted blocks of data, storing the encrypted blocks of data on the storage medium, storing auxiliary data related to times at which the encrypted blocks of data were stored on the storage medium, reading the encrypted blocks of data from the storage medium, re-encrypting the encrypted blocks of data, storing the re-encrypted blocks of data on the storage medium, and storing auxiliary data related to times at which the re-encrypted blocks of data were rewritten on the storage medium.

These and various other features and advantages will be apparent from a reading of the following detailed description.

DETAILED DESCRIPTION OF THE INVENTION

The invention relates generally to methods and apparatus for protecting stored information from unauthorized access, and more specifically to the encryption or manipulation of data in a data storage device such that the data is resistant to discovery through traffic analysis.

Figure 1:
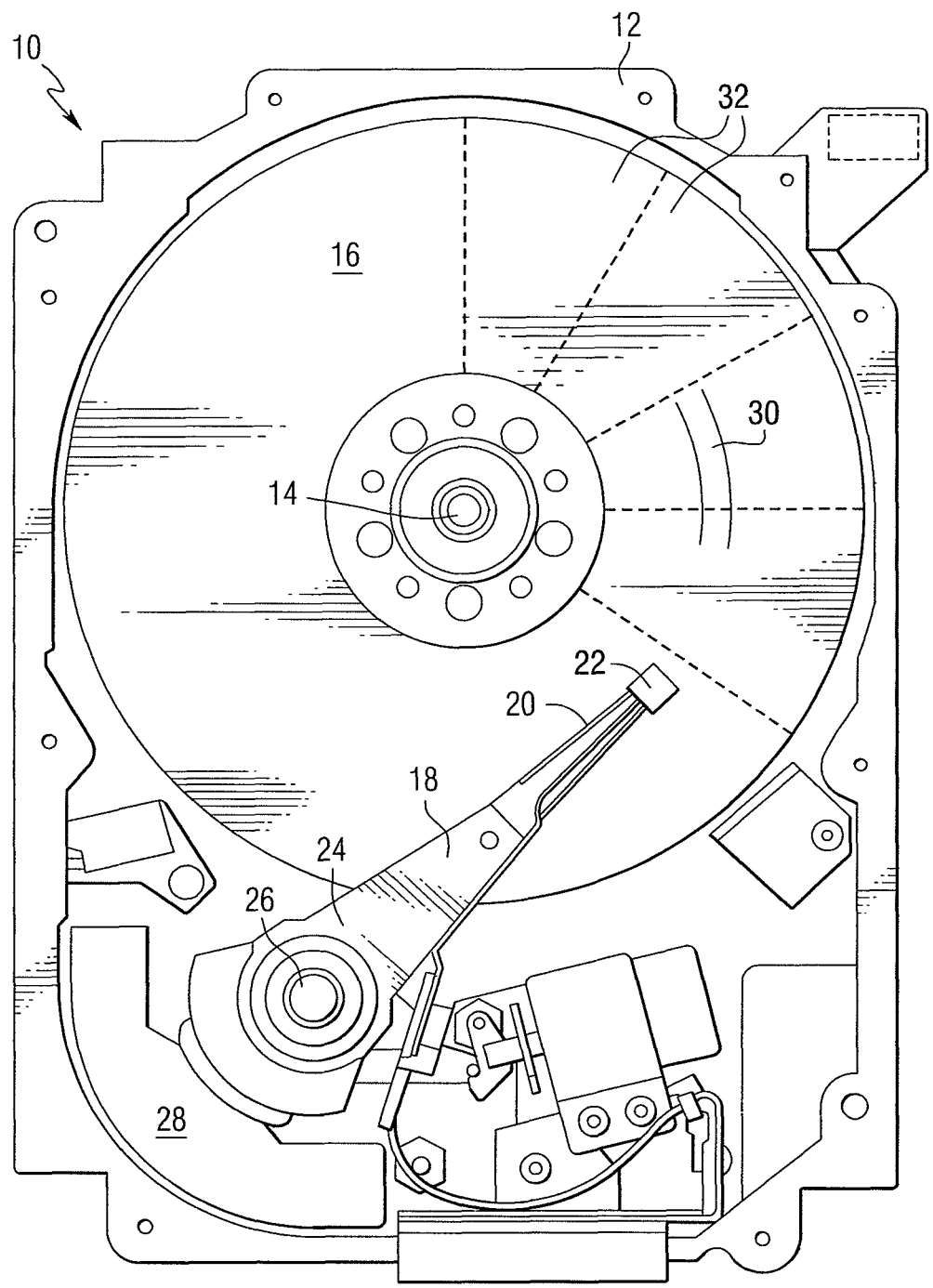
FIG. 1 is a pictorial representation of a data storage device that can be constructed in accordance with an aspect of the invention.

Referring to the drawings, FIG. 1 is a pictorial representation of a data storage device in the form of a disc drive 10 that can be operated in accordance with an aspect of the invention. The disc drive includes a housing 12, with the upper portion removed and the lower portion visible in this view, sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired track on the disc 16. The actuator motor 28 is regulated by a controller that is not shown in this view. Data is stored in concentric tracks 30 on the disc. If multiple discs are included, corresponding tracks on the multiple discs form a cylinder. The tracks are divided into sectors 32 and blocks of data are stored in the sectors.

Figure 2:
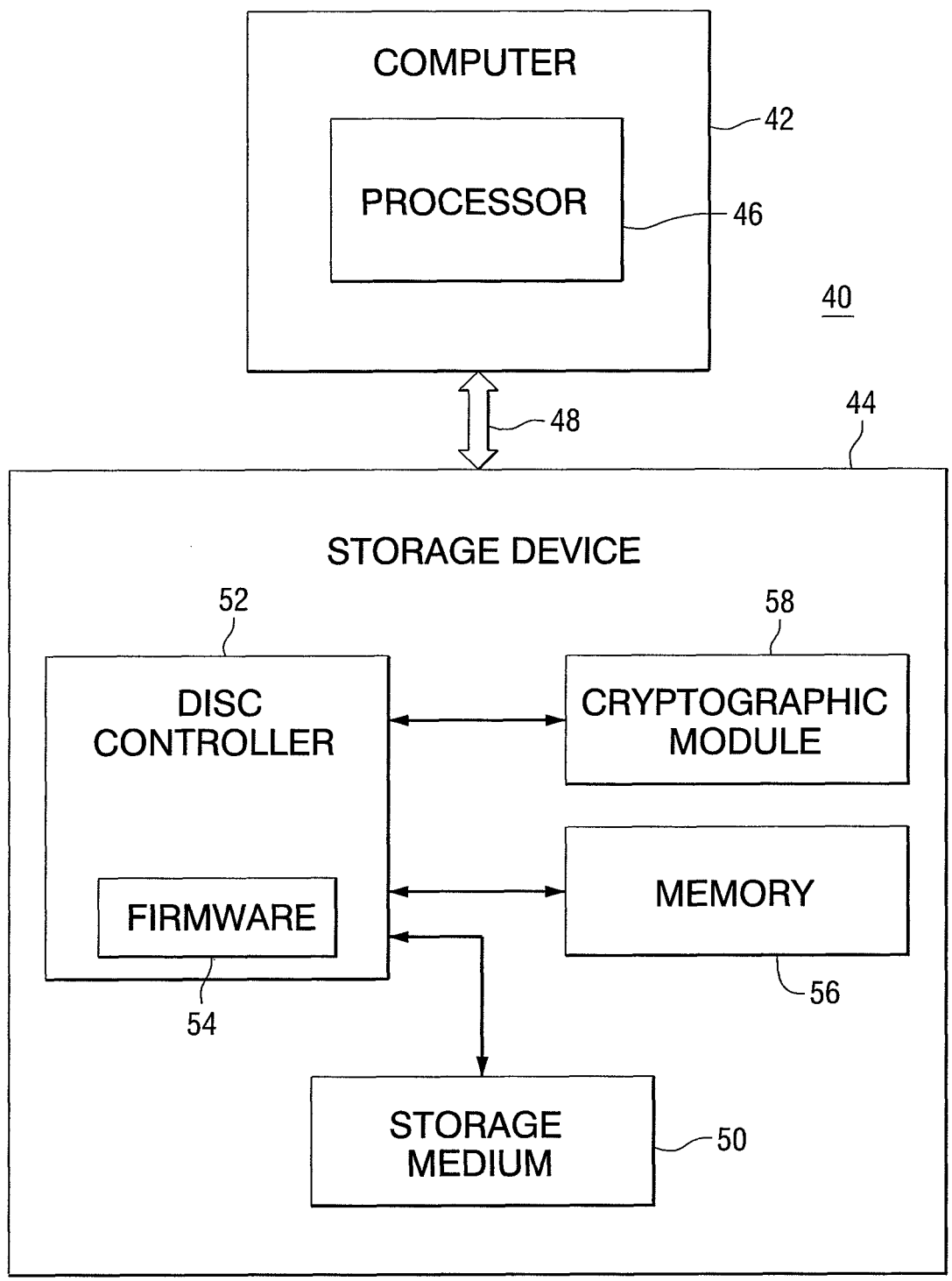
FIG. 2 is a block diagram of a computer system that can be used to practice an aspect of the invention.

FIG. 2 is a block diagram of an apparatus 40 that can be used to practice an aspect of the invention. The apparatus includes a computer 42 and a data storage device 44, which may be for example a disc drive, probe storage device, flash memory, memory card, solid-state storage device, or other storage device. The computer 42 includes a processor 46 that operates in accordance with a host operating system and communicates with the data storage device over a channel 48. The computer would also include other components commonly found in computers, but not shown in this figure, such as input and output devices and memory components. The processor 46 can be operated to perform the various reading, writing and encryption functions described in this description.

The data storage device includes some type of storage medium 50, such as magnetic or optical storage medium or a solid-state memory, and a controller 52 that controls the reading and writing of data from and to the medium. The controller can run firmware 54 that is included in the data storage device and used to process data that is to be written to and/or read from the storage medium. Additional components, including a memory 56 and cryptographic module 58 can be included to facilitate processing of the data. The cryptographic module can be inside the storage device as shown in FIG. 2, or it could be in the host operating system (OS) and implemented in software, or it could be inserted in the data path between the host and the storage device.

In one aspect, the invention provides full cylinder or sector or track encryption for a disc storage device. In one example, a disc drive stores information in a plurality of logical blocks in concentric circular tracks on a rotatable magnetic or optical storage medium. In this aspect of the invention, when data is to be changed somewhere in a track, data on a whole track is read and the changes are applied. Then the data from the whole track is encrypted and written back to the disc.

With this approach, if an adversary were to compare snapshots of the stored information before and after the change, the only information that could be determined from the comparison is that data had changed somewhere in the track. Thus it would be difficult to draw any meaningful conclusions from the changes between snapshots.

In another aspect of the invention, to implement the encryption, a portion of stored data from a track on a storage medium can be read to a buffer and the contents of the buffer can be encrypted. The selected portion of the track would contain data that is to be handled together. For example, data in the portion can be read and decrypted for data access, or read, decrypted, modified, encrypted, and written back to the disc for data write operation. The portion can be, for example, a predefined portion, such as a whole sector, a contiguous sequence of a half, third, etc. of the blocks in the sector, or even every $k^{th}$ block in the sector (every other, every third, etc.), forming interleaved block sequences. The storage blocks within a sector can be arbitrarily partitioned into portions, to be handled together.

Any portion of the track data can be handled together, but in one example the portion includes an integer number of sectors. Using more than one sector gives proportionally less information about the location of data changes for traffic analysis. The portion can be chosen according to the capabilities of the encryption hardware and software, achieving the best trade-off of access speed, buffer size, the complexity of the encryption engine, data access latency, etc.

Figure 3:
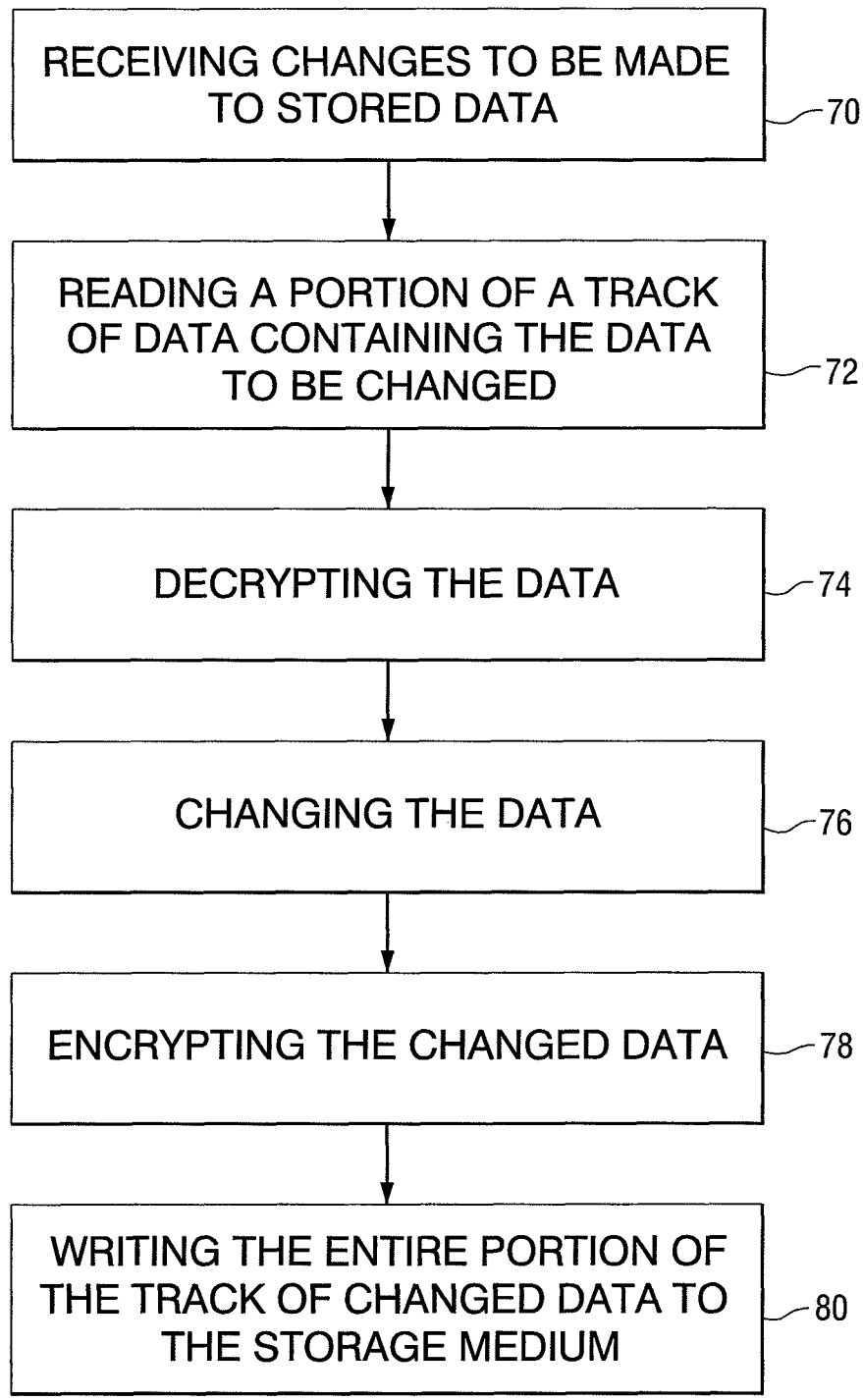
FIG. 3 is a flow diagram that illustrates one aspect of the invention.

FIG. 3 is a flow diagram that illustrates one aspect of the invention. The host sends a block of data with its desired location (LBA) to the disc drive, which determines the track in which the LBA lies, reads the data, decrypts the data, modifies the LBA, encrypts the modified data and writes it back to the modified LBA.

In the example of FIG. 3, a host computer transmits changes to the data that is stored on the disc (block 70). A portion of a track of data, including the data to be changed, is read to a buffer memory (block 72) and the changes are made after the old data is read and decrypted (block 74). Then the entire portion, including the changed data (block 76), is encrypted (block 78) and written to the disc (block 80). In this example, the disc drive does the encryption. The encryption is a "wide block" encryption, that is, each bit in the plaintext influences all the bits of the ciphertext.

In another aspect of the invention, instead of using a passive approach where the storage system does not initiate actions, the invention provides an active storage system, which introduces many changes in the data layout (i.e., location), so an adversary cannot tell which changes were dummy changes and which changes were real.

Figure 4:
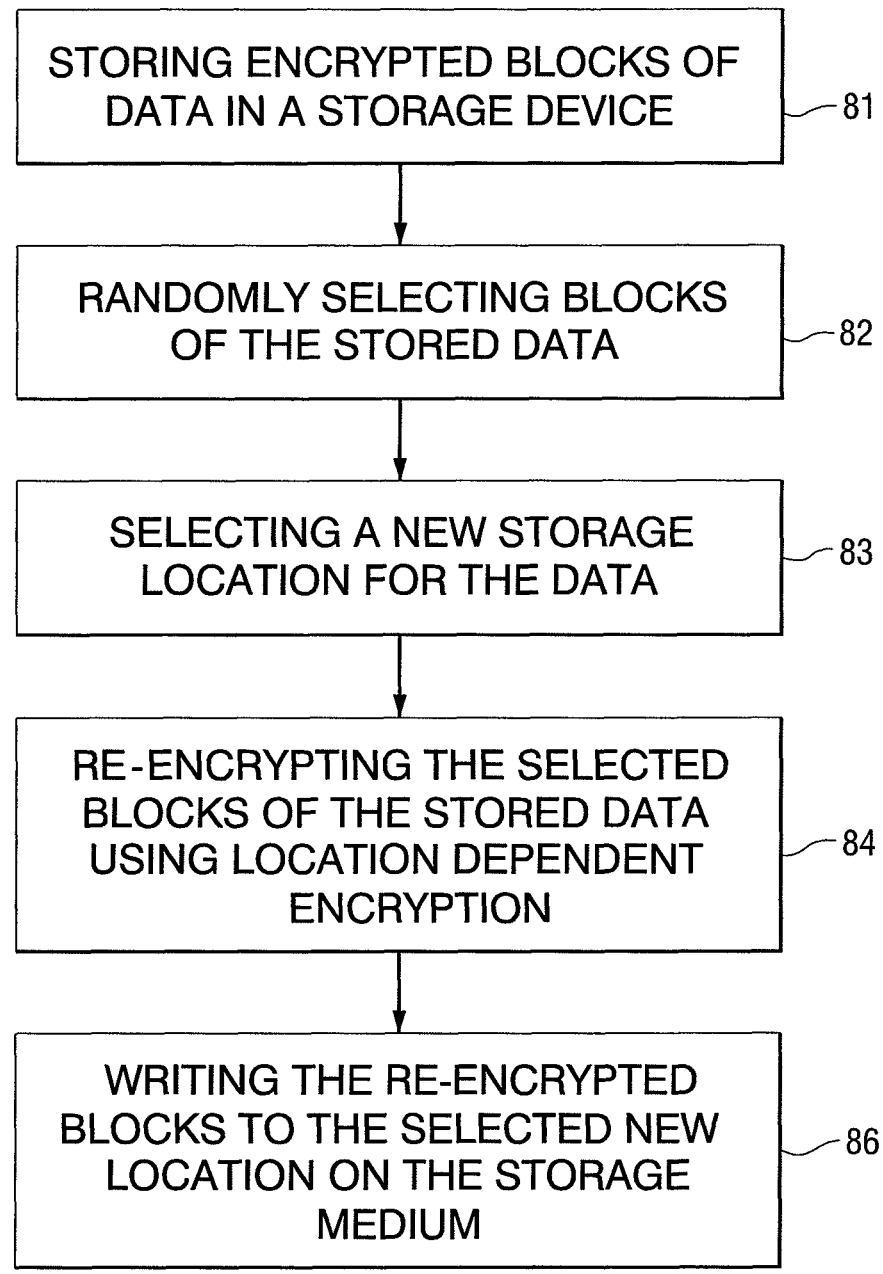
FIG. 4 is a flow diagram that illustrates another aspect of the invention.

One type of active storage system provides random data relocation. FIG. 4 is a flow diagram that illustrates the data relocation method. As shown in block 81, the method starts with encrypted blocks of data that are stored in a storage device. Some of these blocks are randomly selected (block 82) together with new locations for them (block 83), and the selected blocks get re-encrypted with an encryption method dependent on the new locations (block 84). Then the re-encrypted blocks of data are stored to the new locations on the storage medium (block 86).

The data blocks are encrypted differently, i.e., using a different encryption scheme or a different key, depending on their location on the storage medium. That is, the same data will look different when stored in a different location on the storage medium.

Random data relocation can be implemented in the host operating system (OS) level. The encryption is dependent on the data location. In cryptographic terminology, this is called a "location tweak". The key used to perform the encryption is unchanged, but the encryption scheme is tweaked, that is, modified for each possible place on the disc.

It does not matter whether the encryption is performed by the host or by the disc drive. The encrypted form of a randomly chosen block of data will be different in two different locations, so an attacker, who examines the disc off-line, cannot tell if the same data or different data was written to the new location.

Encryption and decryption can be automatic in encrypting storage systems. When data is read, it is presented to the host in decrypted form. When data is written to a disc, it is encrypted with a secret key and the encryption is tweaked by the location. This makes the encryption transparent to the host. The host only has to relocate some blocks of data.

Alternatively, when the file system is known by, or handled by, the storage device (for example in object based storage devices (OSD)), the storage device can perform the relocation operation as a background operation. For example, when the system is idle, randomly selected logical blocks would be re-encrypted within the storage device and relocated to other locations on the medium.

In another example, the relocation operation can be connected to some other useful task, like defragmentation. When defragmentation is performed, data blocks are moved, and therefore, the host does not need to move the affected data again. The host relocates some of those blocks, which are already part of contiguous blocks, and so they are not moved by the defragmentation. These two operations therefore are related, in that one can make the other easier.

Following defragmentation, a portion of the storage medium will be empty. In a defragmented disc, the empty area can be arbitrarily shuffled, or even filled with random data. Files could be moved, to introduce or change gaps between the files, resulting in almost every block being re-encrypted. Any data relocation prevents traffic analysis. The content of any two data blocks can be exchanged with the corresponding changes in the file allocation table or other data systems. With two random locations this is called a "shuffle". However, random locations need not be used. The blocks can be moved more regularly, for example where Block[k] is exchanged with Block[k+1] for a range of blocks.

This results in many changed blocks of data, and an adversary cannot tell by comparing snapshots which changes correspond to new data and which are the results of data relocation.

Another type of active storage system provides a data refresh operation. For each block of information, it is useful to store the time when it was written. After a certain time the data can be rewritten to the same location and auxiliary data identifying the write time would be updated. The block encryption can be modified (i.e., tweaked) with this time-of-last-write data, so a refreshed block looks completely different.

In one aspect, the data storage device could be the encrypting device. It could have a real time clock, it could receive the current time from the host, or the device may use a counter that is incremented after a certain number of write operations. The time related auxiliary data can be stored together with the corresponding data blocks, in a manner similar to an error correction code or with servo information, in the gap between blocks, or in a separate table.

Encryption can be done also by the host, which, for example, uses shorter logical data blocks than the physical data blocks, and fills the empty space with the time related auxiliary data. The device drivers can add and remove the auxiliary data transparently, so software applications do not need to be modified.

Encryption can be tweaked by any data, not only by the storage location. For example, the counter/time auxiliary data can be simply appended or prepended to the location, or combined in an exclusive OR operation with it, to obtain the tweak, which is used to modify the encryption.

Figure 5:
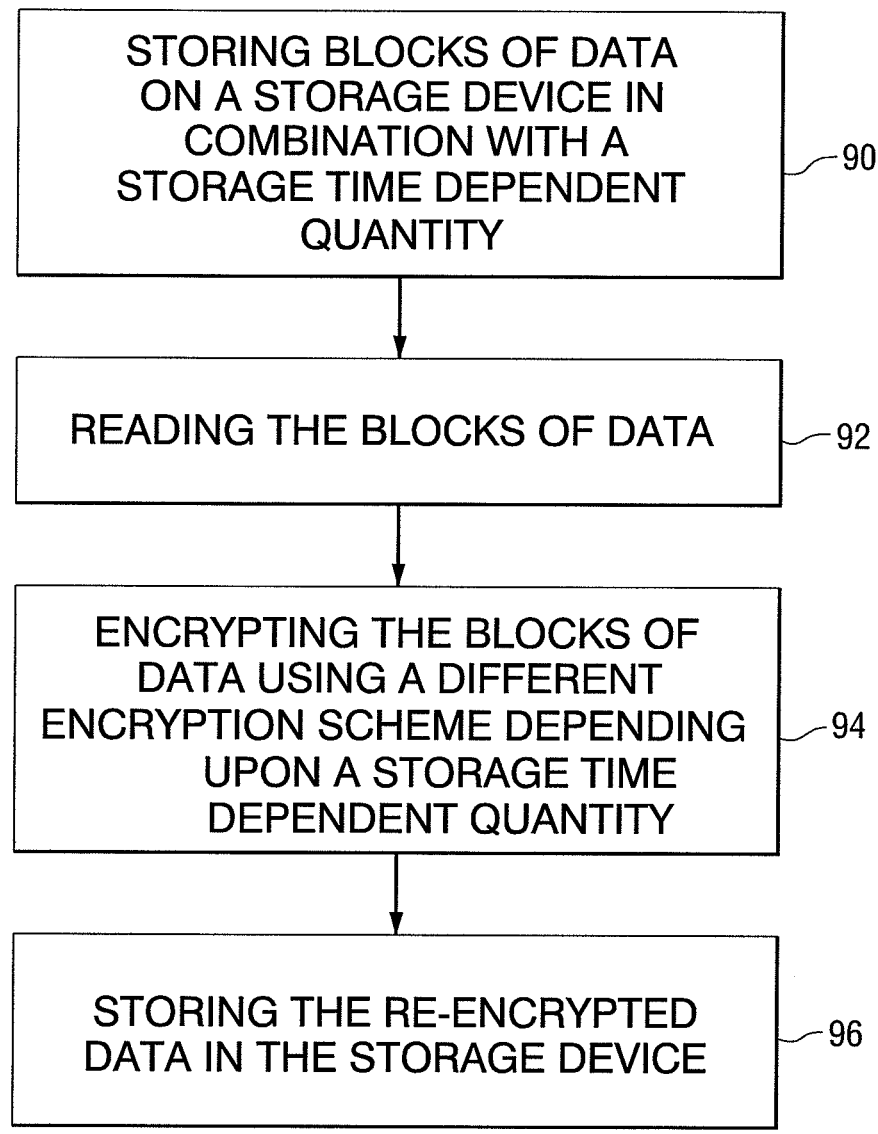
FIG. 5 is a flow diagram that illustrates another aspect of the invention.

FIG. 5 is a flow diagram that illustrates this aspect of the invention. The blocks of data are stored in combination with an indication of the times at which the blocks were stored (block 90). Then the blocks are read (block 92) and re-encrypted with an encryption scheme that differs from the encryption scheme used when the data was previously stored. For example, the encryption scheme can depend on the times at which the blocks were stored (block 94). Next the re-encrypted blocks of data are written back to the storage medium (block 96).

With this approach, the storage device not only refreshes the oldest blocks, but also some other randomly chosen blocks. This way an adversary cannot tell by comparing snapshots, which changes correspond to new data, and which are the results of a data refresh operation.

The storage device may be able to write data more densely, because due to frequent refreshing of the data, demagnetization in time is less likely to degrade the data integrity. Thus, this scheme could lead to an increase of storage capacity.

Although this invention has been described with reference to a disc drive, it is straightforward to extend the concept to other storage devices, such as probe storage devices, flash memories, memory cards, or solid-state memory devices.

The implementation described above and other implementations are within the scope of the following claims.

What is claimed is:

1. A method of processing data internal to a computing device comprising:
   determining, at a data storage controller, a specific portion of data to modify based on a request from a host computer to store data associated with a specific logical block address;
   in response to determining the specific portion is to be modified, retrieving, via the data storage controller, encrypted selected data from a disc data storage medium, the encrypted selected data including the specific portion and another portion of data that is not associated with the request, where the specific portion and the another portion are both located in a same track of the disc data storage medium;
   decrypting, via the data storage controller, the encrypted selected data to reveal the specific portion and the another portion;
   modifying, via the data storage controller, the specific portion to produce a changed portion, while not modifying the another portion;
   encrypting, via the data storage controller, the changed portion and the another portion to produce encrypted changed selected data; and
   storing the encrypted changed selected data to the disc data storage medium.

2. The method of claim 1, wherein the encrypted selected data comprises an integer number of sectors of data from the same track.

3. The method of claim 1, wherein the encrypted selected data includes a whole track of data from the same track of the disc data storage medium.

4. The method of claim 1, wherein encrypting the changed portion and the another portion includes performing wide block encryption.

5. The method of claim 1 wherein the specific portion includes the data associated with the specific logical block address and the another portion does not include the data associated with the specific logical block address.

6. The method of claim 5 further comprising randomly selecting the another portion from a multitude of available data portions of the same track.

7. The method of claim 6, further comprising: writing the encrypted changed selected data to the storage medium includes selecting a different physical location to store the encrypted changed selected data that is not a same physical location that the encrypted selected data was stored.

8. The method of claim 7 further comprising encrypting the changed portion and the another portion using a different encryption key than the encrypted selected data was encrypted with.

9. The method of claim 8 wherein the encryption is performed by a data storage device such that the encryption is transparent to the host computer.

10. The method of claim 8 wherein the encryption is performed by the host computer.

11. A device comprising:
    a computer processor configured to:
       process a request from a host to store data associated with a specific logical block address;
       retrieve selected data, including first data associated with the specific logical block address and second data not associated with the specific logical block address, from a storage medium in response to an indication to change the first data but not the second data, the first data and the second data both including host data having different corresponding logical block addresses,
       decrypt the selected data via a cryptographic module,
       make changes to the first data to produce changed data,
       encrypt, via the cryptographic module, the changed data and the second data to produce encrypted changed selected data, and
       store the encrypted changed selected data to the storage medium.

12. The device of claim 11 further comprising the storage medium communicatively coupled to the computer processor to allow retrieving of data from the storage medium and storing of data to the storage medium.

13. The device of claim 11 wherein the changes correspond to the request to store data associated with the specific logical block address and the first data includes the data associated with the specific logical block address and the second data does not include the data associated with the specific logical block address.

14. The device of claim 11 wherein the computer processor is further adapted to select a different physical location of a data storage medium to store the encrypted changed selected data, where the different physical location is not a same physical location that the selected data was previously stored at.

15. The device of claim 11 wherein the computer processor is further adapted to produce the encrypted changed selected data using a different encryption key than the selected data was encrypted with.

16. A method of decryption and encryption performed internal to a computing device comprising:

process a request to change specific data associated with a specific logical block address of a data storage device;

based on the request to change the specific data, retrieving a first data portion mapped to the specific logical block address, and retrieving a second data portion not mapped to the specific logical block address and having a different logical block address than the first data portion;

decrypting data including the first data portion and the second data portion;

changing the first data portion to produce a changed first data portion;

not changing the second data portion;

encrypting together the changed first data portion and the second data portion that is unchanged to produce encrypted changed data; and storing the encrypted changed data to the data storage device.

* * * * *